United States Patent
Whiteman et al.

(10) Patent No.: US 11,441,655 B2
(45) Date of Patent: Sep. 13, 2022

(54) AXLE ASSEMBLY WITH TORQUE SENSOR

(71) Applicant: DEERE & COMPANY, Moline, IL (US)

(72) Inventors: Steven R. Whiteman, Dubuque, IA (US); Dean H. Lehrke, Altamont, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/095,284

(22) Filed: Nov. 11, 2020

(65) Prior Publication Data
US 2021/0190190 A1   Jun. 24, 2021

Related U.S. Application Data

(60) Provisional application No. 62/952,217, filed on Dec. 20, 2019.

(51) Int. Cl.
*F16H 48/08* (2006.01)
*F16H 48/40* (2012.01)
*F16H 48/42* (2012.01)

(52) U.S. Cl.
CPC .............. *F16H 48/08* (2013.01); *F16H 48/40* (2013.01); *F16H 2048/423* (2013.01)

(58) Field of Classification Search
CPC ..................................... F16H 57/01–2507/012
See application file for complete search history.

(56) References Cited

U.S. PATENT DOCUMENTS

| | | |
|---|---|---|
| 3,305,818 A | 2/1967 | Brueggeman et al. |
| 3,902,738 A | 9/1975 | Gandrud |
| 4,002,139 A | 1/1977 | Payne |

(Continued)

FOREIGN PATENT DOCUMENTS

| | | |
|---|---|---|
| DE | 102010027010 A1 | 1/2012 |
| DE | 102012200232 A1 | 7/2013 |

(Continued)

OTHER PUBLICATIONS

Eric Hicks, Torque Sensors on Electric Bikes, retrieved from Internet (https://www.electricbike.com/Torque-Sensors/#Comments), dated Oct. 18, 2012, 1-11 pages.

(Continued)

*Primary Examiner* — Ernesto A Suarez
*Assistant Examiner* — James J Taylor, II

(57) ABSTRACT

A torque sensing assembly of a differential of an axle assembly is shown in the present disclosure. The differential may include a differential housing portion, a drive pinion positioned within the differential housing portion, a ring gear, a carrier, a differential pinion, a first side gear, a second side gear, a first bearing, a first bearing support, and the torque sensing assembly. The first bearing is coupled to the differential housing portion and rotatable with the carrier. The first bearing support is coupled to the differential housing portion and used to support the first bearing. The torque sensing assembly is coupled to the first bearing support and operable to measure a strain thereof resulted from a separation force created between the drive pinion and ring gear.

6 Claims, 10 Drawing Sheets

(56) References Cited

U.S. PATENT DOCUMENTS

| | | | |
|---|---|---|---|
| 4,173,259 A * | 11/1979 | Heckenkamp | A01B 63/112 172/10 |
| 4,474,060 A | 10/1984 | Crossman | |
| 4,530,245 A | 7/1985 | Jacobson | |
| 4,608,861 A | 9/1986 | Wachtler et al. | |
| 4,625,554 A | 12/1986 | Lanzoni | |
| 4,821,563 A | 4/1989 | Maron | |
| 7,240,570 B2 | 7/2007 | McDearmon | |
| 7,357,748 B2 * | 4/2008 | Kelley, Jr. | F16H 48/08 192/11 OB |
| 7,631,553 B2 | 12/2009 | Heim et al. | |
| 7,706,936 B2 | 4/2010 | Krzystofczyk et al. | |
| 9,052,011 B2 | 6/2015 | Morselli et al. | |
| 10,309,847 B2 | 6/2019 | Cheng et al. | |
| 10,837,544 B2 * | 11/2020 | Dewa | F16H 57/0471 |
| 2005/0081649 A1 * | 4/2005 | Takahashi | G01G 19/12 73/862.474 |
| 2006/0070464 A1 * | 4/2006 | Walker | G01L 1/2243 73/862.631 |
| 2006/0117863 A1 | 6/2006 | Kim | |
| 2009/0021363 A1 | 1/2009 | Heise et al. | |
| 2015/0057897 A1 * | 2/2015 | Stoiber | G01L 5/171 701/50 |
| 2018/0259051 A1 | 9/2018 | Chinitz et al. | |
| 2020/0200626 A1 | 6/2020 | Whiteman et al. | |

FOREIGN PATENT DOCUMENTS

| | | |
|---|---|---|
| DE | 102015201577 A1 | 8/2016 |
| DE | 102015201607 A1 | 8/2016 |
| DE | 202018107337 U1 | 1/2019 |
| DE | 102017120796 A1 | 3/2019 |
| DE | 102019216027 A1 | 6/2020 |
| EP | 1627762 A2 | 2/2006 |
| EP | 2615022 A1 | 7/2013 |
| JP | 2012189495 A | 10/2012 |
| WO | WO2003082527 A1 | 10/2003 |
| WO | WO2013104981 A1 | 7/2013 |
| WO | WO2016120093 A2 | 8/2016 |
| WO | WO2016120095 A1 | 8/2016 |

OTHER PUBLICATIONS

Torque Sensor and Geared Drive, retrieved from Internet (https://www.electricbike.com/torque-sensors/), dated Jul. 6, 2015, 1-7 pages.
German Search Report issued in counterpart application No. 102020216198.4 dated Mar. 4, 2021 (10 pages).

* cited by examiner

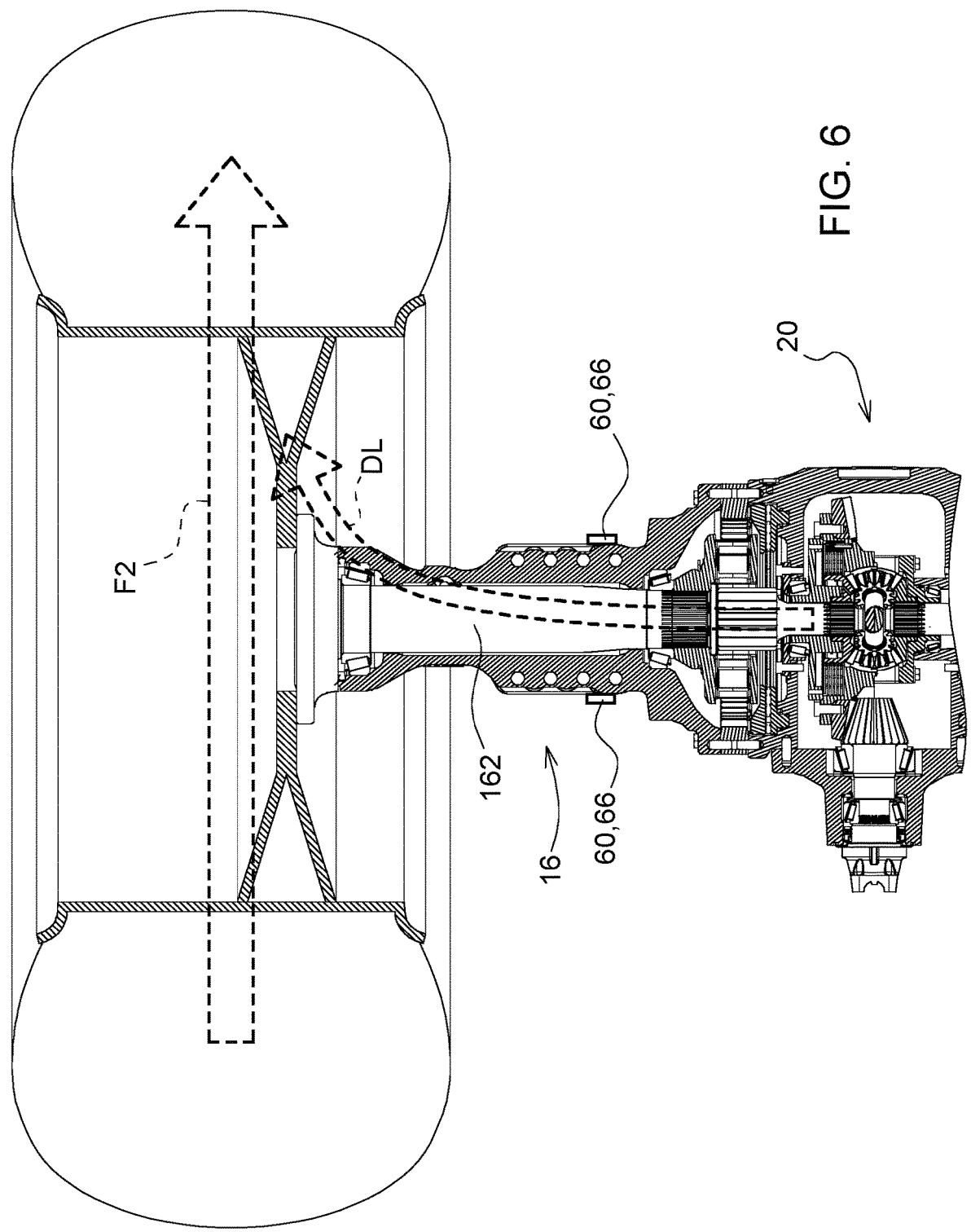

AXLE ASSEMBLY WITH TORQUE SENSOR

RELATED APPLICATIONS

This application claims priority to U.S. Application No. 62/952,217, titled Torque Sensor, filed on Dec. 20, 2019, which is hereby incorporated by reference in its entirety.

FIELD OF THE DISCLOSURE

The present disclosure relates generally to an axle assembly and a torque sensing assembly applied on an axle assembly.

BACKGROUND OF THE DISCLOSURE

For mechanical powertrain systems, measurement of axle torque applied to an axle assembly such as a front axle assembly is desirable since it may affect the efficiency and longevity of individual powertrain components and may provide information for further use or processing relating to the operation of the vehicle and any connected implements or attachments.

SUMMARY OF THE DISCLOSURE

An axle assembly coupled to a drive shaft is provided. The axle assembly may include a first axle unit, a second axle unit, a differential coupled to the first axle unit and the second axle unit therebetween, an axle housing, a drive pinion positioned within the axle housing, a ring gear, a carrier, a differential pinion, a first side gear and a second side gear, a first axle shaft, a second axle shaft, a first bearing, a first bearing support, and a torque sensing assembly. The ring gear is engaged with the drive pinion and is driven by the drive pinion to rotate. The carrier is attached to the ring gear and to rotate with the ring gear. The differential pinion is coupled to the carrier and operable to rotate with the ring gear and to self-rotate about a differential pinion axis. The first side gear and the second side gear are respectively engaged with the differential pinion and driven by the differential pinion. The first axle shaft is coupled to and rotating with the first side gear. The second axle shaft is coupled to and rotating with the second side gear. The first bearing is coupled to the axle housing and rotatable with the carrier. The first bearing support is coupled to the axle housing and used to support the first bearing. The torque sensing assembly is coupled to at least one of the axle housing and the first bearing support operable to measure a strain thereof resulted from a separation force created between the drive pinion and the ring gear.

In one aspect of the present disclosure, the torque sensing assembly includes a first strain gage and a second strain gage positioned on the first bearing support.

In one aspect of the present disclosure, a first radial direction from a center of the first bearing support toward the first strain gage and a second radial direction from the center of the first bearing support toward the second strain gage forms an angle smaller than 60 degrees.

In one aspect of the present disclosure, the axle assembly further includes a fastener positioned on the first bearing support. The first strain gage, the fastener, and the second strain gage are on a circular arc, and the first strain gage and the second strain gage are at the ends of the circular arc.

In one aspect of the present disclosure, the fastener is positioned in the middle of the circular arc.

In one aspect of the present disclosure, a distance between the first side gear and the ring gear being closer than a distance between the second side gear and the ring gear.

In one aspect of the present disclosure, the torque sensing assembly includes a third strain gage coupled to a first housing portion of the first axle unit and operable to measure the strain of the first housing portion when the first axle unit is in operation.

In one aspect of the present disclosure, the first bearing support protrudes a first outer ring portion coupled to a first outer race of the first bearing.

In one aspect of the present disclosure, the axle housing includes a differential housing portion of the differential. The differential housing portion includes a first differential side plate to which the first bearing support is coupled.

In one aspect of the present disclosure, the first differential side plate includes a receiving hole extending in a direction from a surface of the differential housing portion toward the first bearing. The receiving hole is used to receive a fourth strain gage which includes a strain gaged pin operable to measure a strain in the receiving hole.

In one aspect of the present disclosure, the fourth strain gage includes a gage fastener coupling a body of the fourth strain gage to the differential housing portion so as to provide an axial preload relative to the body of the fourth strain gage.

In one aspect of the present disclosure, a sensing portion of the body of the fourth strain gage engages a bottom of the receiving hole to measure the strain thereof and to cooperate with the gage fastener to provide the axial preload.

In one aspect of the present disclosure, the fourth strain gage and the receiving hole are press-fit.

In one aspect of the present disclosure, the fourth strain gage includes an upper portion and a lower portion coupled to the upper portion. The lower portion has a smaller diameter than does the upper portion and operable to measure the strain in the receiving hole.

A differential of an axle assembly is provided. The differential may include a differential housing portion, a drive pinion positioned within the differential housing portion, a ring gear, a carrier, a differential pinion, a first side gear, a second side gear, a first bearing, a first bearing support, and a torque sensing assembly. The ring gear is engaged with the drive pinion and is driven by the drive pinion to rotate. The carrier is attached to the ring gear and is used to rotate with the ring gear. The differential pinion is coupled to the carrier and operable to rotate with the ring gear and to self-rotate about a differential pinion axis. The first side gear and the second side gear are respectively engaged with the differential pinion and driven by the differential pinion. The first bearing is coupled to the differential housing portion and rotatable with the carrier. The first bearing support is coupled to the differential housing portion and used to support the first bearing. The torque sensing assembly is coupled to the first bearing support and operable to measure a strain thereof resulted from a separation force created between the drive pinion and the ring gear.

In one aspect of the present disclosure, a distance between the first side gear and the ring gear being closer than a distance between the second side gear and the ring gear.

A differential of an axle assembly is provided. The differential may include a differential housing portion, a drive pinion positioned within the differential housing portion, a ring gear, a carrier, a differential pinion, a first side gear, a second side gear, a first bearing, a first bearing support, and a torque sensing assembly. The ring gear is engaged with the drive pinion and is driven by the drive pinion to rotate. The carrier is attached to the ring gear and is used to rotate with the ring gear. The differential pinion is coupled to the carrier and operable to rotate with the ring gear and to self-rotate about a differential pinion axis. The first side gear and the second side gear are respectively engaged with the differential pinion and driven by the differential pinion. The first bearing is coupled to the differential housing portion and rotatable with the carrier. The first bearing support is coupled to the differential housing portion and used to support the first bearing. The torque sensing assembly is coupled to the differential housing portion and operable to measure a strain thereof resulted from a separation force created between the drive pinion and the ring gear.

In one aspect of the present disclosure, the differential housing portion includes a first differential side plate to which the first bearing support is coupled, the first differential side plate includes a receiving hole extending in a direction from a surface of the differential housing portion toward the first bearing. The receiving hole is used to receive the torque sensing assembly which includes a strain gaged pin operable to measure a strain in the receiving hole.

Other features and aspects will become apparent by consideration of the detailed description and accompanying drawings.

BRIEF DESCRIPTION OF THE DRAWINGS

FIG. 6 is a partial cross-sectional view of the axle assembly of FIG. 1 showing two of the third strain gages.

DETAILED DESCRIPTION OF THE DRAWINGS

Figure 1:
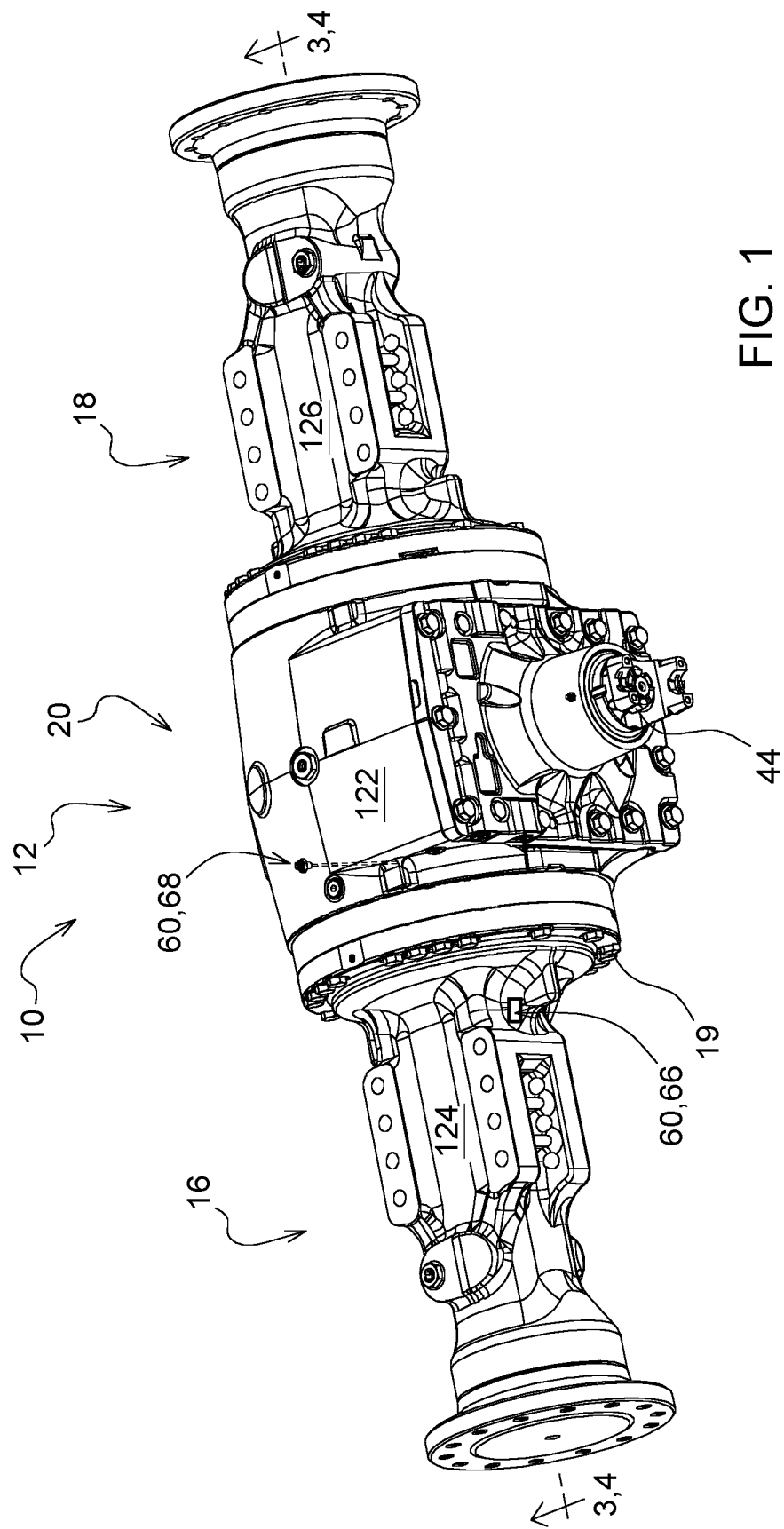
FIG. 1 is schematic perspective view of an axle assembly.

The present disclosure includes a torque sensing assembly having one or more than one strain gages applied on a bearing support of a driveline component such as a differential. The differential may be an open (standard) differential or a limited slip differential (LSD). The strain gages detect the strain on the bearing support and/or other part of the drivetrain and such value may be used by a controller to calculate a torque of a drive shaft (front axle drive shaft, for example) or another component because the strain values detected from certain location of the bearing support or other location of axle housing may have a positive correlation with the torque of the drive shaft (axle input torque). In particular, the strain and the torque may be in a substantial linear relationship.

Due to geometry of a front axle drive shaft with a drive pinion, and a ring gear, a carrier, a differential pinion(s) (spider gears) attached to the carrier (in this embodiment the number is two), a differential side gear(s) (in this embodiment the number is two), a first bearing, bearing support, etc., the strain gage(s) of torque sensing assembly detect strains caused from a separation load/force. The separation load is resulted from the engagement (or reaction force) between the drive pinion and the ring gear. The detail structure is described below.

As shown in FIGS. 1-3, and 9 a work vehicle 99 includes an axle assembly 10. The work vehicle 99 may include but is not limited to an agricultural equipment such as combine, tractor, harvester, loader, or a construction equipment such as backhoe, dump truck, dozer, excavator, motor grader, scraper, or a forestry equipment such as feller buncher, skidder and skidder. The work vehicle 99 may include any other vehicle having one or more drivetrain components described herein. The axle assembly 10 as shown in FIGS. 1-4 in the present disclosure is a front axle assembly 10 but, in another implementation, it can be rear axle assembly or other axle assembly. The axle assembly 10 in another implementation may be installed at front and rear locations, that is, four-wheel drive. The (front) axle assembly 10 includes an axle housing 12. The front axle assembly 10 may include a first axle unit 16, a second axle unit 18, and a differential 20 coupled to the first axle unit 16 and the second axle unit 18 therebetween via bolts 19. The first axle unit 16 has a first axle shaft 162 and the second axle unit 18 has a second axle shaft 182. The first axle shaft 162 and the second axle shaft 182 are respectively coupled to a portion of ground engaging unit, such as wheel rim (not shown). The axle housing 12 of the axle assembly 10 includes a differential housing portion 122 of the differential 20, a first housing portion 124 of the first axle unit 16, a second housing portion 126 of the second axle unit 18. The axle housing 12 is operable to receive variable driveline components such as differential case, gears, shafts, which will be described later.

Figure 3:
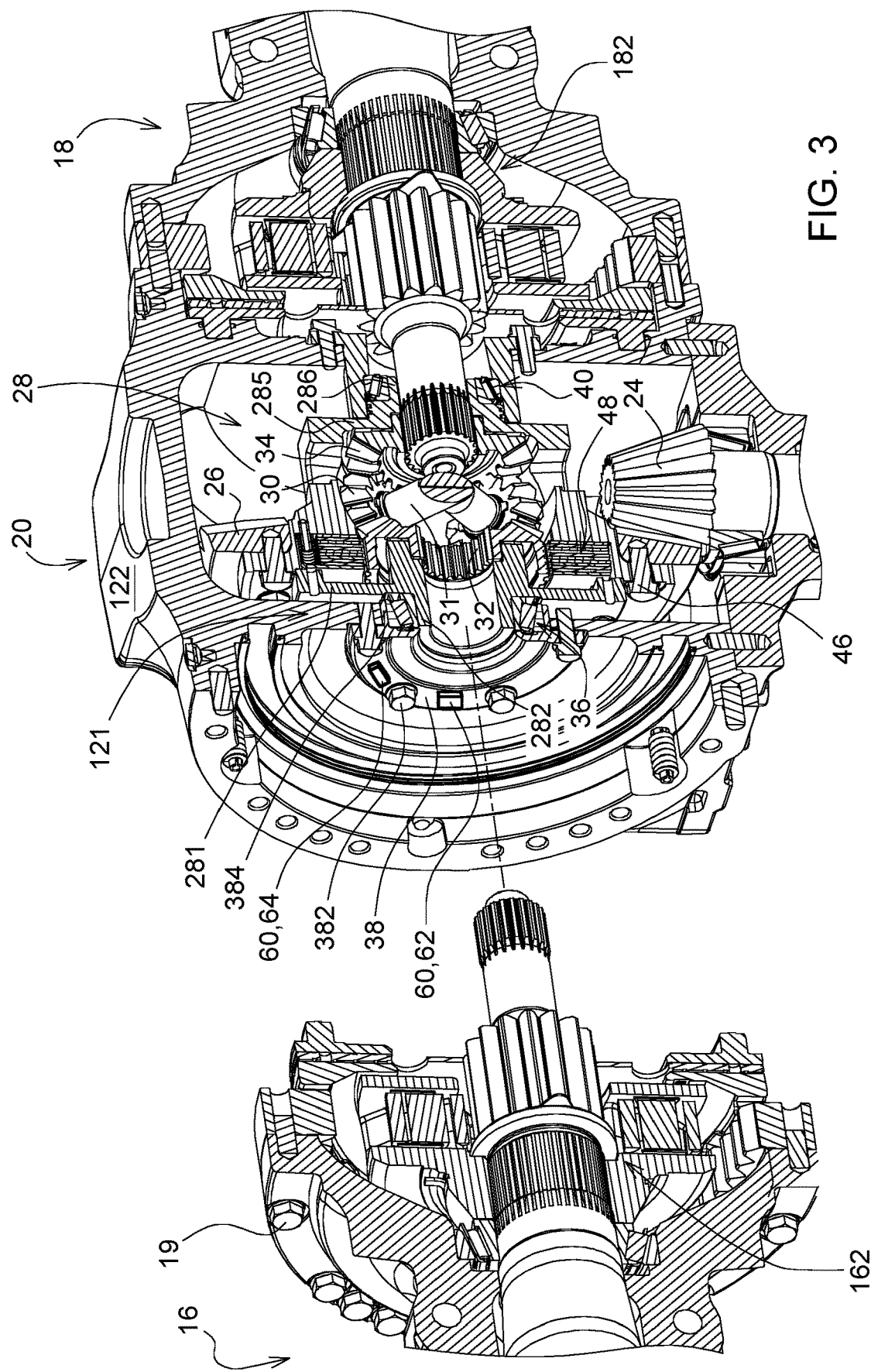
FIG. 3 is an exploded cross-sectional perspective view of the axle assembly of FIG. 1.
Figure 4:
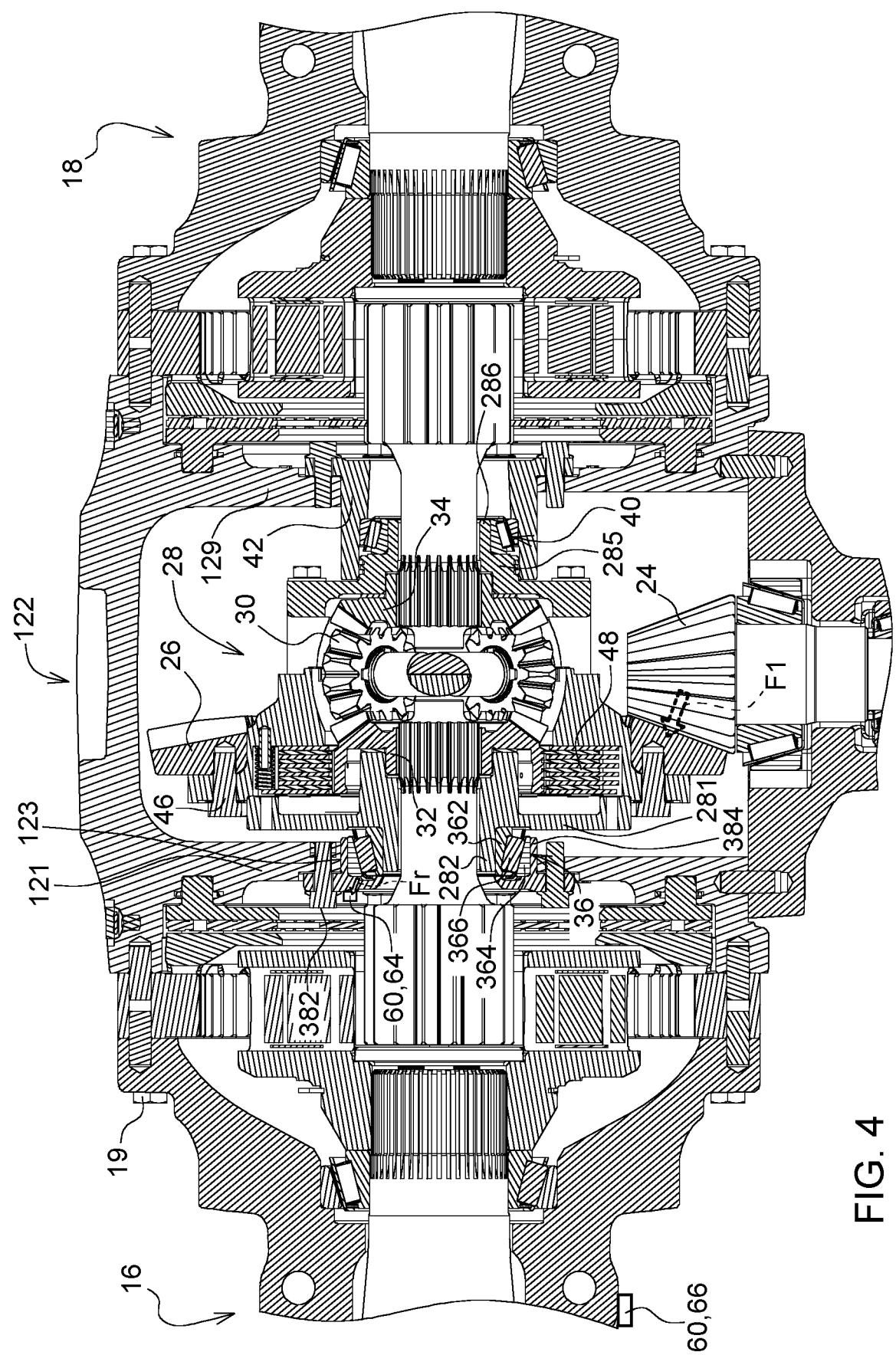
FIG. 4 is an exploded cross-sectional view of the axle assembly of FIG. 1.

As shown in FIGS. 3 and 4, differential 20 coupled to a drive shaft (not shown) may include, but is not limited to an axle housing 12, a drive pinion 24, a ring gear 26, a differential case (carrier) 28, differential pinions (gears) 30, a first side gear 32, a second side gear 34, a first bearing 36, a first bearing support 38, a second bearing 40, and a second bearing support 42. The numbers of aforementioned elements are illustrated only for demonstrative purpose in implementations. The drive pinion 24 is normally coupled to the (front axle) drive shaft (not shown) via a universal joint 44 (shown in FIG. 1). As shown in FIG. 3, the drive pinion 24 is positioned within the axle housing 12. The ring gear 26 is engaged (meshed) with the drive pinion (pinion gear) 24 and is driven by the drive pinion 24 to rotate. The ring gear 26 is a spiral bevel ring gear. The carrier 28 attaches to the ring gear 26 so as to rotate with the ring gear 26. In this embodiment, the carrier 28 is fixed to the ring gear 26 via bolts 46. Within the carrier 28, two differential pins 31, each of which holds a pair of differential pinion(s) 30 (only one differential pinion 30 of each pair of differential pinion 30 are shown in FIG. 3), such that the differential pinions 30 can rotate with the ring gear 26. In addition, the differential pinions 30 can self-rotate about its own differential pinion axis. While the differential pinions 30 rotate and/or self-rotate, they engage with or crawl over the first side gear 32 and/or the second side gear 34 and therefore the first side gear 32 and the second side gear 34 (differential side gears) can rotate independently from the carrier 28. In this regard, when the work vehicle 99 having the differential 20 steers to the left or right, one of the first side gear 32 or the second side gear 34 can ensure the outer wheel or other outer ground engaging unit rotate faster than the inner wheel or other inner ground engaging unit. The power (or torque from the front axle drive shaft) can be transferred through the drive pinion 24, the ring gear 26, the carrier 28 (and clutch plates 48 inside the carrier 28), the differential pinions 30, the first side gear 32 and/or the second side gear 34, and eventually to the first axle unit 16 coupled to the first side gear 32 and/or a second axle unit 18 coupled to the second side gear 34. In this embodiment, a distance in a lateral direction between the first side gear 32 and the ring gear 26 is closer than a distance in the lateral direction between the second side gear 34 and the ring gear 26.

As shown in FIGS. 3 and 4, there are a first bearing 36 and a second bearing 40 applied on different sides of the carrier 28. A distance in the lateral direction between the first bearing 36 and the ring gear 26 is closer than a distance in the lateral direction between the second bearing 40 and the ring gear 26. A first side 281 of carrier 28 protrudes a first inner ring portion 282 (toward a first wheel, not shown) and a second 285 side of the carrier protrudes a second inner ring portion 286 (toward a second wheel, not shown). As to the first bearing 36, shown in FIG. 4, it has a first inner race 362, a first outer race 364 (first bearing cup), and rolling elements 366 (such as rollers) between the first inner race 362 and the first outer race 364. The first inner race 362 is coupled to the first inner ring portion 282 and is configured to rotate with the carrier 28. The rolling elements 366 are coupled to the first inner race 362 and configured to roll in response to the rotation of the first inner race 362. The first outer race 364, which the rolling elements 366 roll relative to, is fixed to a first bearing support 38 (quill). The first bearing support 38 (quill) is coupled to the differential housing portion 122 of the axle housing 12 and is configured to support the first bearing 36. As shown in FIG. 4, a body of the first bearing support 38 is positioned on the left of the first bearing 36 to prevent the first bearing 36 from moving out of the differential 20. The differential housing portion 122 includes a first differential side plate 121 and a second differential side plate 129, and the carrier 28 is positioned therebetween. The first bearing support 38 is coupled to the first differential side plate 121 by fasteners 382, which are bolts in this implementation. The first bearing support 38 protrudes a first outer ring portion 384 coupled to the first outer race 364 and is parallel to the first inner ring portion 282 of the carrier 28 in this embodiment. The first bearing 36 is sandwiched by the first inner ring portion 282 of the carrier 28 and the first outer ring portion 384 of the first bearing support 38. The first differential side plat 121 includes an aperture 123. The first outer ring portion 384 of the first bearing support 38 and the aperture 123 are press-fit.

In this embodiment, a torque sensing assembly 60 is applied on the first bearing support 38. However, in another embodiment the torque sensing assembly (not shown) can be applied on the second bearing support 42. In another variation, both of the first bearing support 38 and the second bearing support 42 may be installed with one or more than one torque sensing assemblies 60. The strain gages of the torque sensing assemblies 60, as shown in the following implementations, may be located at or in bearing containment elements like bearing support member(s) that deflect under strain when loaded. These strain gages thus create strain signals that are caused by gear separation forces proportional to drivetrain torque. Because the strain gages may be positioned on or adjacent to the bearing and the bearing support, at which the gear separation forces of interest may be located, the strain measurements are thus less influenced by vehicle structural loads.

Figure 5:
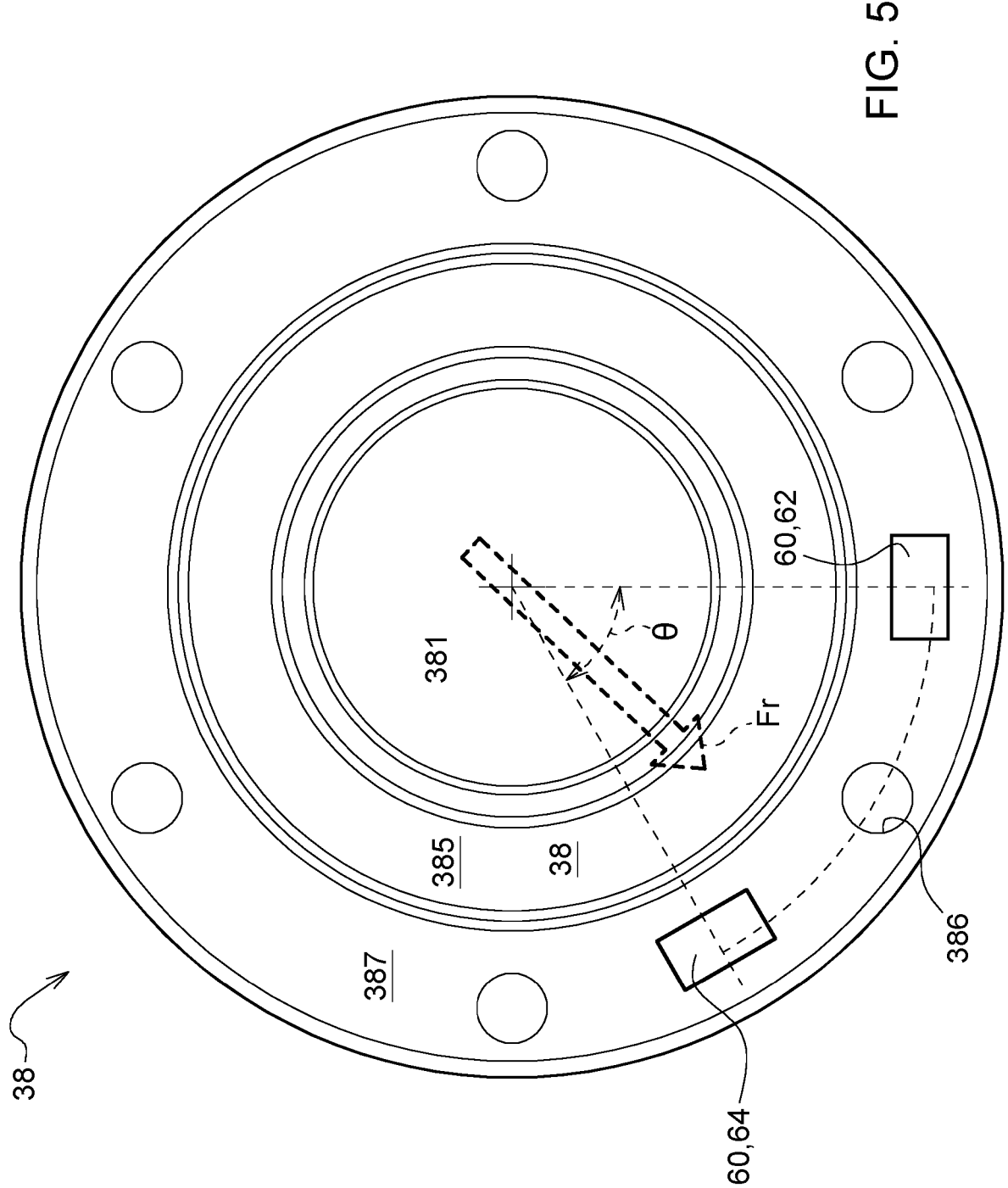
FIG. 5 is a front view of a first bearing support having a first and a second strain gages shown in FIGS. 3 and 4.

Referring to FIGS. 4 and 5, in this embodiment, the torque sensing assembly 60 includes a first strain gage 62 and a second strain gage 64 positioned on the first bearing support 38. A first radial direction from a center of the first bearing support 38 toward the first strain gage 62 and a second radial direction from the center of the first bearing support 38 toward the second strain gage 64 forming an angle θ smaller than or equal to 60 degrees, for example. In another embodiment, the angle can be different degrees. As shown in FIG. 5, the first bearing support 38 in this embodiment has an axle hole 381 through which the first axle shaft 162 passes through. The first bearing support 38 may have an inner support portion 385 adjacent to the axle hole 381 and may have an outer support portion 387, which is a flange or flatform from the inner support portion 385. The inner support portion 385 and the outer support portion 387 form a step therebetween. In this embodiment, the outer support portion 387 of the first bearing support 38 include multiple holes 386. There are multiple fasteners 382 as mentioned previously, couple the first bearing support 38 to the first differential side plate 121 of the differential housing portion 122 through the holes 386 of the outer support portion 387. In this embodiment, the first strain gage 62 and the second strain gage 64 are positioned on the outer support portion 387 of the first bearing support 38. One of the fasteners 382 is positioned between the first strain gage 62 and the second strain gage 64. The first strain gage 62, the fastener 382, and the second strain gage 64 are on a circular arc. The first strain gage 62 and the second strain gage 64 are at the end of the circular arc. The fastener is positioned in the middle of the circular arc but in another embodiment, it does not have to be in the middle.

In variation, there are more than one fastener aligned in the same arc between the first strain gage 62 and the second strain gage 64.

In variation, there is only one strain gage or more than two strain gages applied on the outer support portion and/or the inner support portion. In variation, no or not all the strain gage are required to position on the same circular arc.

In this embodiment, the holes 386 on the outer support portion 387 of the first bearing support 38 spaced apart equally. For the strain measurement purpose, the distance of holes 386 may be different in another embodiment. For example, a hole (if there is only one) between the first strain gage 62 and the second strain gage 64 is defined as a unique hole. A distance between the adjacent regular hole is longer than a distance between two adjacent regular holes (not shown). For another embodiment, there is no hole between the first strain gage 62 and the second strain gage 64 but a distance between a hole adjacent to the first strain gage 62 and another hole adjacent to the second strain gage 64 is longer than a distance between two other adjacent regular holes. In variation, the fastener (if only one) between the first stain gage 62 and the second strain gage 64 may be different from other fastener, which could be smaller or more flexible; the hole corresponding to that fastener may corresponding to the size of the fastener.

In another embodiment, the first bearing support 38 is coupled to the first differential side plate 121 of the differential housing portion 122 by other means.

In another embodiment, the first bearing support 38 may additionally include different type of hole(s)/aperture(s) for receiving torque sensor assembly 60 such as the first strain gage 62 and the second strain gage 64. Such hole(s) can be a blind hole(s) or through hole(s). The torque sensor assembly 60 (the first strain gage 62 or the second strain gage 64) may include a holder attaching to the wall of the hole. The holder may be press-fit to the hole. The torque sensor assembly may also include a sleeve corresponding and attached to a holder inner surface. One or more than one strain sensors is/are attached to the sleeve and configured to detect a strain of the first bearing support resulted from the separation force between the drive pinion and the ring gear. Optionally, the sleeve is a flexible printed circuit board electrically coupled to the plurality of strain gages via traces.

Figure 9:
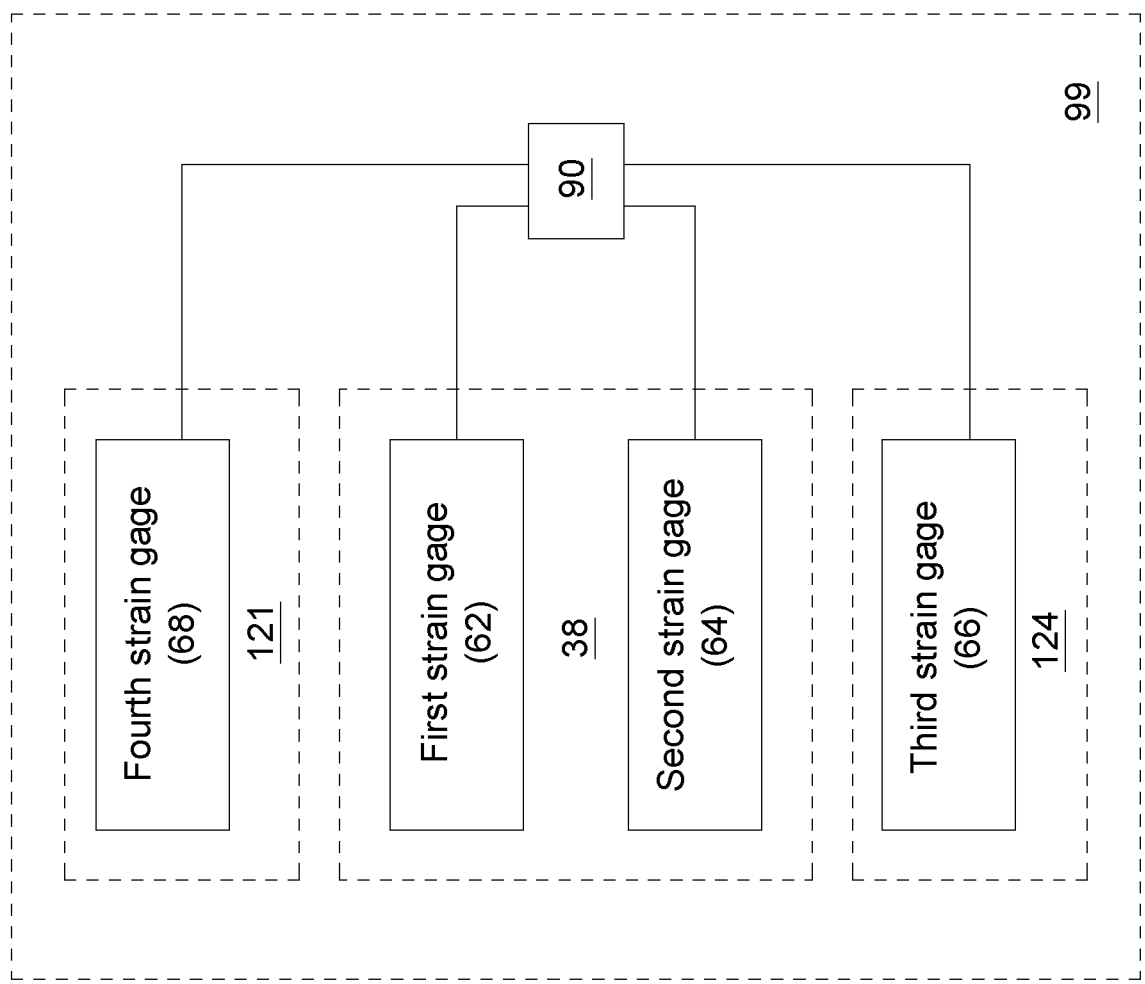
FIG. 9 is a diagrammatic view illustrating the controller connecting the first, second, third, and fourth strain gages located in different parts of the axle assembly.

As shown in FIGS. 3 and 4, when the drive pinion 24 rotates, a separation force F1 caused by the rotation of the (spiral bevel) drive pinion 24 and ring gear 26 is created. A resultant gear separation force Fr, the magnitude of which may be proportional to the separation force F1 between the drive pinion 24 and the ring gear 26, transmits to the first bearing support 38. The torque sensor assembly 60, such as the first strain gage 62 and/or the second strain gage 64, therefore detects the strain cause by resultant gear force Fr. As shown in FIG. 9, a controller 90 of a work vehicle 99 having the axial assembly 10 may receive the strain signals from the torque sensor assembly 60 such as the first strain gage 62, the second strain gage 64, a third strain gage 66, and/or a fourth strain gage 68 to calculate the axle input torque due to the correlation based on geometry. The third strain gage 66 and the fourth strain gage 68 will be introduced in the later description.

The number of the third strain gage 66 can be one or more than one. FIGS. 1 and 4 demonstrate one third strain gage 66; FIG. 6 demonstrates two third strain gages 66. The third strain gage(s) 66 is coupled to a first housing portion 124 of the first axle unit 16 and operable to measure the strain of the first housing portion 124 when the first axle unit 16 is in operation. As shown in FIG. 6, a deflection in the first housing portion 124 may be proportional to the axle input torque due to the reaction of the traction forces F2 from the tires/wheels, and a crowd force therefore applied on the axle unit 16. This deflection DL can be monitored with the third strain gages 66. The resulting output of the third strain gage 66 may be directly proportional to axle input torque.

Figure 7A:
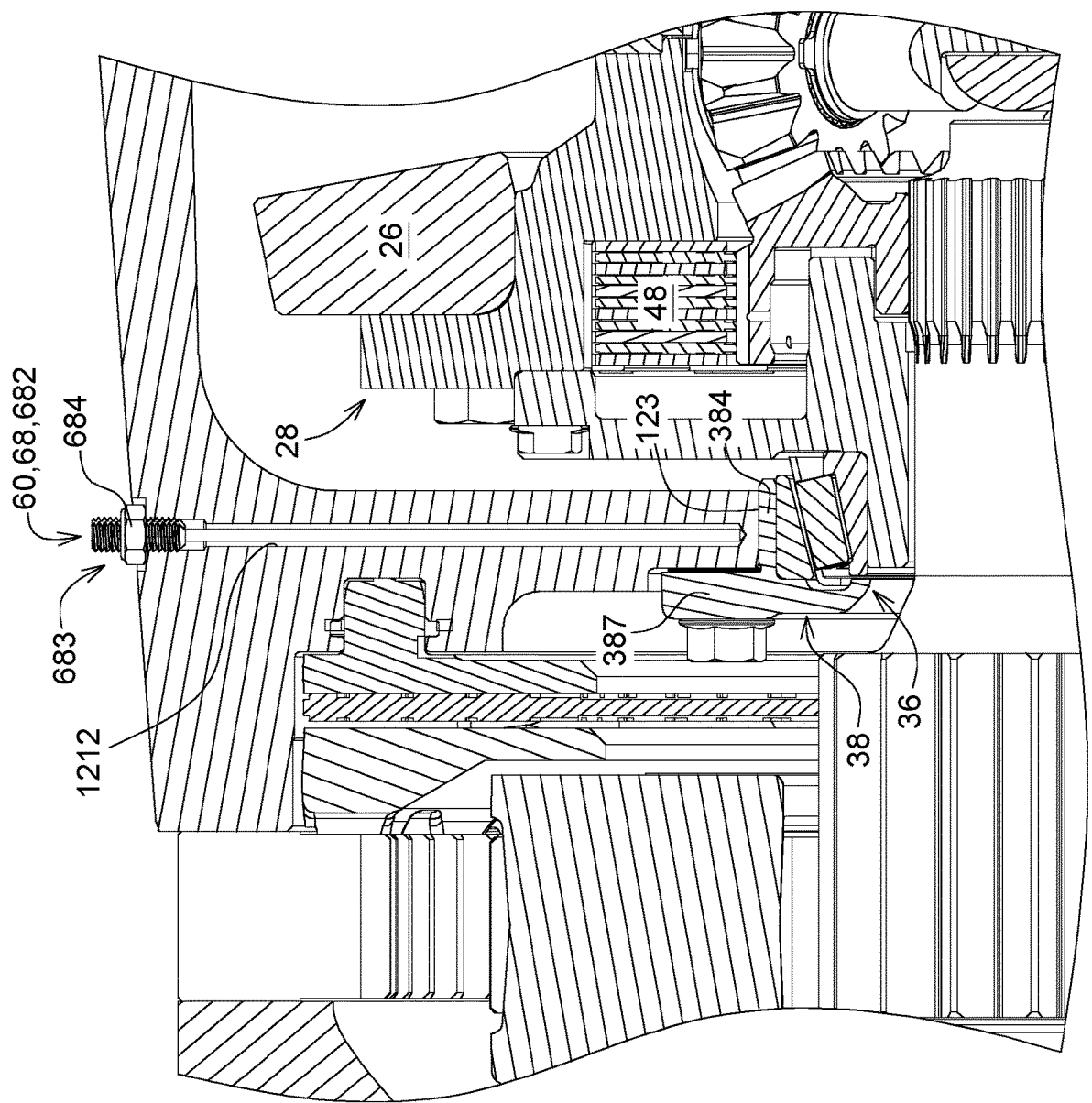
FIG. 7A is a cross-sectional view of the fourth strain gage having a strain gaged pin in one implementation.
Figure 7B:
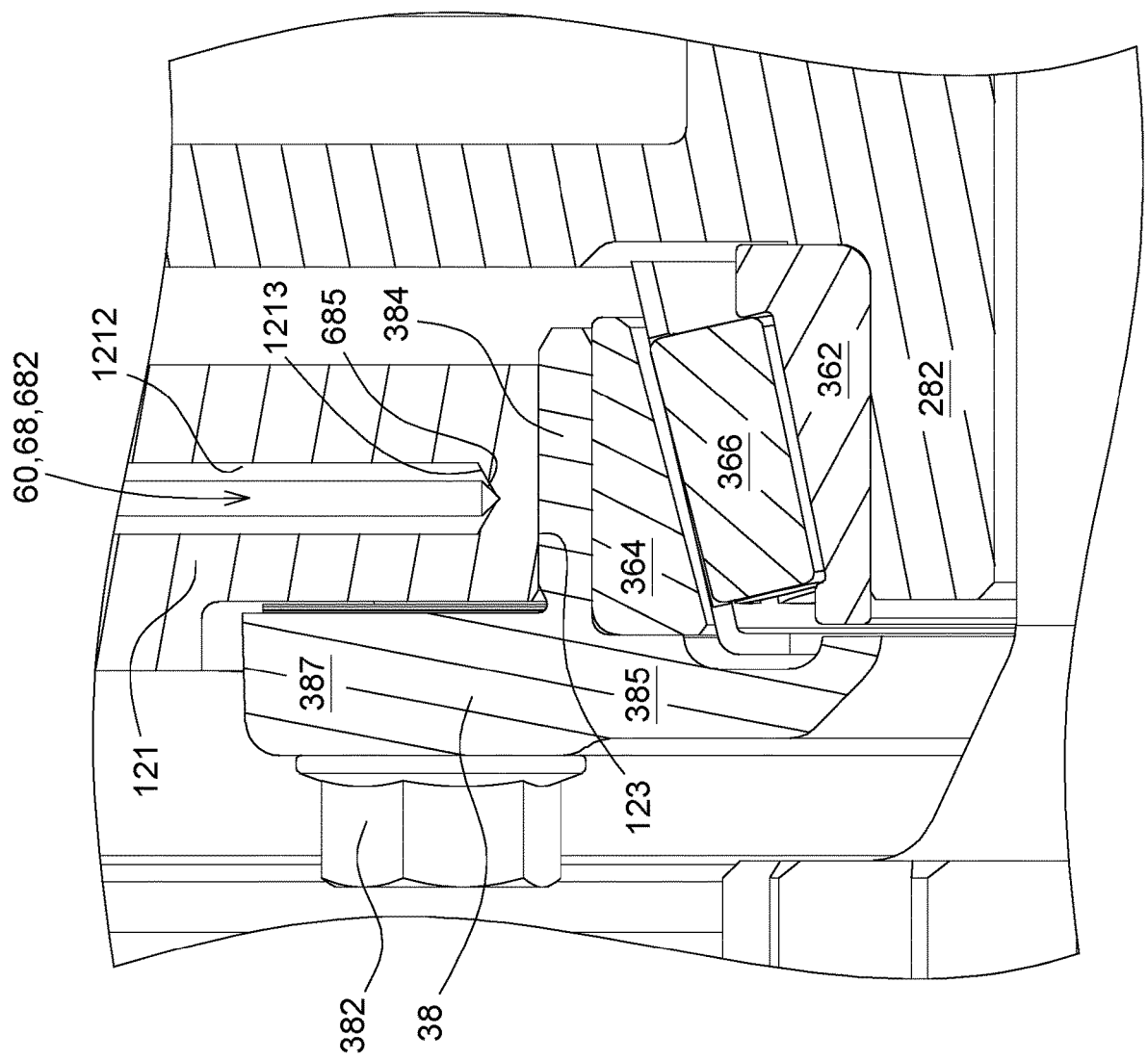
FIG. 7B is an enlarged cross-sectional view of the fourth strain gage of FIG. 7A.
Figure 8:
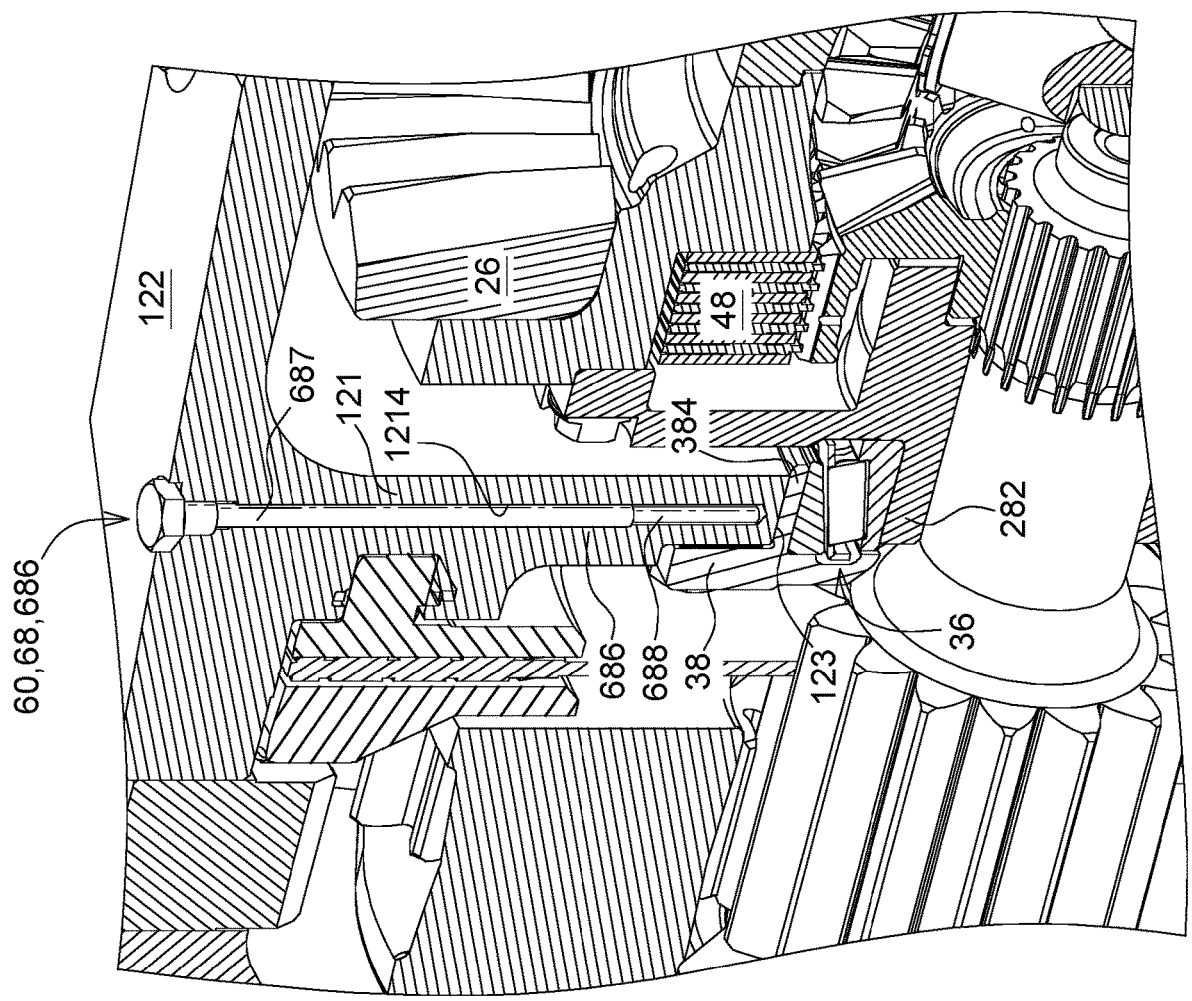
FIG. 8 is a cross-sectional view of the fourth strain gage having a strain gaged pin in another implementation.

Referring to FIGS. 7A, 7B, and 8, the fourth stain gage 68 of the torque sensing assembly 60 is introduced. The first differential side plate 121 of the differential housing portion 122 includes a receiving hole 1212 (receiving hole 1214 in FIG. 8) extending in a radial direction from a surface the differential housing 122 toward the first bearing 36. The bottom 1213 of the receiving hole 1212 is adjacent to the aperture 123 of the first differential side plate 121. The receiving hole (1212 or 1214) is configured to receive the fourth strain gage 68 which includes a strain gaged pin (682 or 686) operable to measure the strain in the receiving hole (1212 or 1214) of the first differential side plate 121 resulted from the separation force F1. Because the first outer ring portion 384 of the first bearing support 38 abuts aperture 123 (press-fit) and the outer support portion 387 of the first bearing support 38 overlap with a lower portion of the receiving hole (1212, 1214) in a radial direction relative to the center of the axle hole 381 of the first bearing support 38, a resultant force may be easily transmitted to the receiving hole (1212, 1214) causing a deflection thereof and benefits the measurement of the strain detected by the fourth strain gage 68.

Figure 2:
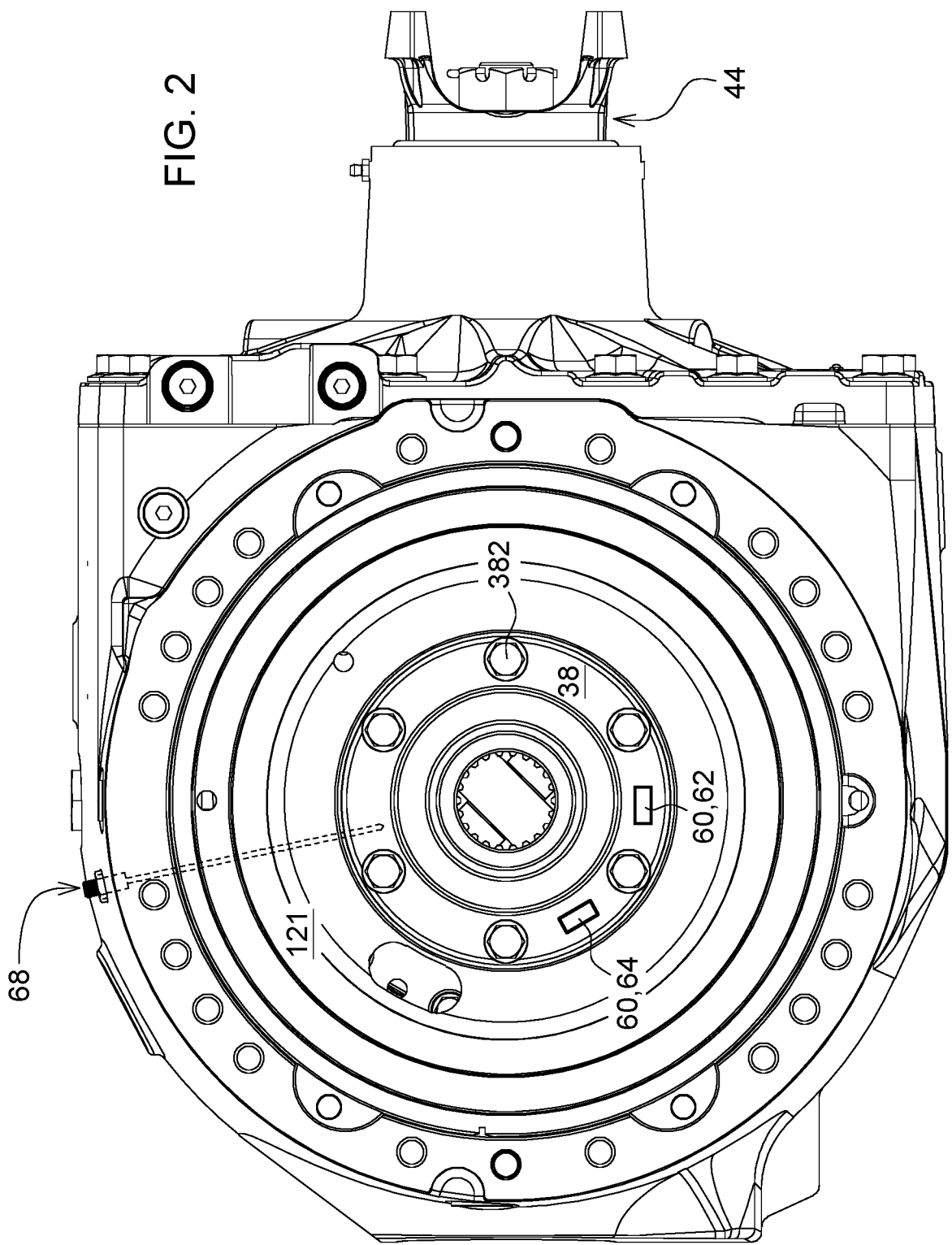
FIG. 2 is side view of a differential of the axle assembly with a first axle unit removed.

In one implementation, as shown in FIGS. 2, 7A and 7B, the fourth strain gage 68 includes a strain gaged pin 682. The strain gaged pin 682 includes a gage fastener 683 coupling a body of the strain gaged pin 682 to the differential housing portion 122. The gage fastener 683 may include a threaded feature coupled to a threaded upper portion of the receiving hole 1212 and a nut 684 coupled to the threaded feature. A sensing portion 685 of the strain gaged pin 682, which is bottom of the body of the strain gaged pin 682 in this implementation, engages the bottom 1213 of the receiving hole 1212 to measure the strain thereof. The sensing portion 685 cooperates with the gage fastener 683 to provide an axial preload relative to the body of the strain gaged pin 682. The axial preload can be consistent and is adjustable by the nut 684 of gage fastener 683. The consistent axial preload on the strain gaged pin 682 can ensure the strain gaged pin 682 measure the strain accurately.

Referring to FIG. 8, the fourth strain gage 68 includes a strain gaged pin 686. The strain gaged pin 686 and the receiving hole 1214 are press-fit, which may also provide an axial preload. The configuration of the receiving hole 1214 is corresponding to that of the strain gaged pin 686. The strain gaged pin 686 includes an upper portion 687 and a lower portion 688 coupled to the upper portion 687. The lower portion 688 has a smaller diameter than does the upper portion 687 and operable to measure the strain in the receiving hole 1212. It is noted that the lower portion 688 of the strain gaged pin 686 has a press fit into a lower portion of the receiving hole 1212, which is an active area of the differential housing portion 122 for strain measurement.

As shown in FIG. 9, the first strain gage 62, the second strain gage 64, the third strain gage 66, and the fourth strain gage 68 measure the strains on the first bearing support 38, the first housing portion, and/or the first differential side plate 121 and transmit the signal(s) indicative of the strain resulting from the separation force F1 or the operation of the first axle unit 16 to the controller 90 of a work vehicle 99 to calculate the torque. The relationships between axle input torque, the first bearing support deflection and strain thereof and axle housing deflection and the can be mathematically defined based on the size of the gears, tire size and stiffness of the axle components. The controller(s) 90 may include but not limit to engine control unit (ECU), transmission control unit (TCU), and chassis control unit (CCU), and signal controller (analyzer) coupled to the strain gages 62, 64, 66, 68. The signal controller communicates with ECU, TCU, CCU through Controller Area Network (CAN) (not shown). CAN frames are normally placed on a CAN Bus, which comprises a first signal carrying line and a second signal carrying line. The controller(s) 90 is connected to the first and second signal carrying lines. The controller(s) 90 may be coupled to or include a memory operable to storing data.

Measurement of torques may be used for different purposes. For example, the torque information can be received by the controller 90, and if there is an excessive torque load, controller 90 may slow the engine speed to ensure the efficiency and longevity of powertrain units. Direct driveline torque measurement may be used in engine control. By sensing driveline torque more directly, the anticipated engine load can be communicated to the ECU electronically so the engine can be fueled appropriately before the mechanical load is transmitted through the driveline components and pulls the engine down (power management). Direct driveline torque measurement may be used for adaptive shift control (ASC) in a powertrain control unit to gears in an appropriate manner for different slope of ground surface. Direct driveline strain measurement may also be used in driveline prognostics. The driveline strain signal can be monitored and compared to a normal driveline signature. Deviations from this normal signal may indicate damage incurred by gears and bearings. A sustained deviation from normal can be used to warn the operator or dealer of impending driveline failure.

Without in any way limiting the scope, interpretation, or application of the claims appearing below, a technical effect of one or more of the example embodiments disclosed herein is to measure the strain from the bearing support or axle housing where the other loadings, such as vehicle structural loads, may not interfere with the measurement.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An axle assembly coupled to a drive shaft, the axle assembly comprising:
    a first axle unit;
    a second axle unit;
    a differential coupled to the first axle unit and the second axle unit therebetween;
    an axle housing;
    a drive pinion positioned within the axle housing;
    a ring gear engaged with the drive pinion and driven by the drive pinion to rotate;
    a carrier attached to the ring gear and configured to rotate with the ring gear;
    a differential pinion coupled to the carrier operable to rotate with the ring gear and to self-rotate about a differential pinion axis;
    a first side gear and a second side gear respectively engaged with the differential pinion and driven by the differential pinion;
    a first axle shaft coupled to and rotating with the first side gear;
    a second axle shaft coupled to and rotating with the second side gear;
    a first bearing coupled to the axle housing and rotatable with the carrier;
    a first bearing support coupled to the axle housing and configured to support the first bearing; and
    a torque sensing assembly coupled to at least one of the axle housing and the first bearing support operable to measure a strain thereof resulted from a separation force created between the drive pinion and the ring gear;
    wherein the axle housing includes a differential housing portion of the differential, and the differential housing portion includes a first differential side plate to which the first bearing support is coupled, and the first differential side plate includes a receiving hole extending in a direction from a surface of the differential housing portion toward the first bearing, and the receiving hole configured to receive a fourth strain gage which includes a strain gaged pin operable to measure a strain in the receiving hole.

2. The axle assembly of claim 1, wherein the fourth strain gage includes a gage fastener coupling a body of the fourth strain gage to the differential housing portion so as to provide an axial preload relative to the body of the fourth strain gage.

3. The axle assembly of claim 2, wherein a sensing portion of the body of the fourth strain gage engages a bottom of the receiving hole to measure the strain thereof and to cooperate with the gage fastener to provide the axial preload.

4. The axle assembly of claim 1, wherein the fourth strain gage and the receiving hole are press-fit.

5. The axle assembly of claim 4, wherein the fourth strain gage includes an upper portion and a lower portion coupled to the upper portion, and the lower portion has a smaller diameter than does the upper portion and operable to measure the strain in the receiving hole.

6. A differential of an axle assembly, comprising:
    a differential housing portion;
    a drive pinion positioned within the differential housing portion;
    a ring gear engaged with the drive pinion and driven by the drive pinion to rotate;
    a carrier attached to the ring gear and configured to rotate with the ring gear;
    a differential pinion coupled to the carrier operable to rotate with the ring gear and to self-rotate about a differential pinion axis;
    a first side gear and a second side gear respectively engaged with the differential pinion and driven by the differential pinion;
    a first bearing coupled to the differential housing portion and rotatable with the carrier;
    a first bearing support coupled to the differential housing portion and configured to support the first bearing; and
    a torque sensing assembly coupled to the differential housing portion and operable to measure a strain thereof resulted from a separation force created between the drive pinion and the ring gear;
    wherein the differential housing portion includes a first differential side plate to which the first bearing support is coupled, the first differential side plate includes a receiving hole extending in a direction from a surface of the differential housing portion toward the first bearing, and the receiving hole configured to receive the torque sensing assembly which includes a strain gaged pin operable to measure a strain in the receiving hole.

* * * * *